(12) United States Patent
Omer

(10) Patent No.: US 11,257,133 B2
(45) Date of Patent: Feb. 22, 2022

(54) METHOD TO ATTRIBUTE EXPIRATION DATES AND QUANTITIES OF A PRODUCT TO AN SKU CODE FOR PRICING PURPOSE

(71) Applicant: WASTELESS LTD., Tel Aviv (IL)

(72) Inventor: Oded Omer, Holon (IL)

(73) Assignee: Wasteless Ltd., Tel Aviv (IL)

( * ) Notice: Subject to any disclaimer, the term of this patent is extended or adjusted under 35 U.S.C. 154(b) by 0 days.

(21) Appl. No.: 16/761,402

(22) PCT Filed: Nov. 5, 2018

(86) PCT No.: PCT/IB2018/058679
§ 371 (c)(1),
(2) Date: May 4, 2020

(87) PCT Pub. No.: WO2019/087159
PCT Pub. Date: May 9, 2019

(65) Prior Publication Data
US 2020/0364759 A1    Nov. 19, 2020

Related U.S. Application Data

(60) Provisional application No. 62/581,712, filed on Nov. 5, 2017.

(51) Int. Cl.
*G06Q 30/02* (2012.01)
*G06Q 20/20* (2012.01)
*G06Q 30/06* (2012.01)

(52) U.S. Cl.
CPC ....... *G06Q 30/0283* (2013.01); *G06Q 20/201* (2013.01); *G06Q 20/202* (2013.01); *G06Q 30/0625* (2013.01)

(58) Field of Classification Search
CPC .......... G06Q 30/0283; G06Q 30/3625; G06Q 20/201; G06Q 20/202
See application file for complete search history.

(56) References Cited

U.S. PATENT DOCUMENTS 6,298,331 B1 * 10/2001 Walker ................. G06Q 10/087
                                                                  705/15
6,327,576 B1 * 12/2001 Ogasawara ............ G06K 17/00
                                                                  705/22
(Continued)

FOREIGN PATENT DOCUMENTS

JP     2009176193 A    8/2009
WO     2019087159 A1   5/2019

OTHER PUBLICATIONS

Bertolini, Massimo, et al. "Reducing out of stock, shrinkage and overstock through RFID in the fresh food supply chain: Evidence from an Italian retail pilot." (Year: 2013).*

(Continued)

*Primary Examiner* — Asfand M Sheikh
(74) *Attorney, Agent, or Firm* — Gearhart Law LLC; David Postolski

(57) ABSTRACT

A system and method to attribute expiration dates and quantities of a product to an SKU code for pricing purposes. This method applies dynamic pricing to perishable food items. Using bulk tagging capabilities, the supermarket can attribute expiration dates to items without the pain of actually tagging the items with stickers.

13 Claims, 2 Drawing Sheets

(56) References Cited

U.S. PATENT DOCUMENTS

| | | | | |
|---|---|---|---|---|
| 6,557,760 | B2* | 5/2003 | Goodwin, III | G06Q 30/06 235/376 |
| 7,050,991 | B2* | 5/2006 | Ogasawara | G06K 17/00 705/22 |
| 7,185,810 | B2* | 3/2007 | White | G06Q 10/087 235/385 |
| 7,464,873 | B2* | 12/2008 | Spencer | G06Q 10/087 235/383 |
| 7,680,691 | B2* | 3/2010 | Kimball | G06Q 20/203 705/22 |
| 9,488,986 | B1* | 11/2016 | Solanki | G06Q 10/087 |
| 10,127,421 | B1* | 11/2018 | Vercalli | G08B 5/223 |
| 2003/0216969 | A1* | 11/2003 | Bauer | H01Q 7/00 705/22 |
| 2006/0277109 | A1* | 12/2006 | Kerth | G06Q 20/201 705/20 |
| 2013/0246207 | A1* | 9/2013 | Novak | G06Q 30/0641 705/26.2 |
| 2015/0317667 | A1* | 11/2015 | Wohlert | G06Q 30/0235 705/14.35 |
| 2016/0110750 | A1 | 4/2016 | Jung et al. | |
| 2016/0217447 | A1* | 7/2016 | Sarkar | G06Q 20/202 |
| 2018/0114257 | A1* | 4/2018 | Conville | G06Q 30/0283 |
| 2019/0272557 | A1* | 9/2019 | Smith | G06F 17/18 |

OTHER PUBLICATIONS

Mcfarlane, Duncan, and Yossi Sheffi. The impact of automatic identification on supply chain operations. University of Cambridge, Department of Engineering, 2003. (Year: 2003).*

International Search Report in PCT/IB2018/058679 dated Jan. 2, 2019.

Written Opinion in PCT/IB2018/058679 dated Jan. 2, 2019.

International Search Report, dated Jan. 2, 2019, for corresponding PCT Application No. PCT/IB2018/058679, International Filing Date Nov. 5, 2018, consisting of 3 Pages.

Written Opinion, dated Jan. 2, 2019, for corresponding PCT Application No. PCT/IB2018/058679, International Filing Date Nov. 5, 2018, consisting of 5 Pages.

* cited by examiner

METHOD TO ATTRIBUTE EXPIRATION DATES AND QUANTITIES OF A PRODUCT TO AN SKU CODE FOR PRICING PURPOSE

CLAIM OF PRIORITY

This application claims priority to U.S. provisional application No. 62/581,712 filed Nov. 5, 2017, the contents of which are incorporated by reference herein.

FIELD OF THE EMBODIMENTS

The present invention relates to the ability to attribute one expiration date to multiple products have the same Store Keeping Unit (SKU). The supermarket employee will use his smart-phone or any hand-held device to identify the product (SKU), identify and attribute items quantity, and finally, attribute expiration date to the product. The data generated with this portable device will then be transmitted to a local or remote server for further use of stock level management and in-store dynamic pricing application. A detailed flow and description can be found further on this application.

BACKGROUND OF THE EMBODIMENTS

The need for such method emerged from a real day-to-day problem exist in supermarket—product tagging. Basically, since existing barcodes usually carries no meta data beside product name and price, additional tagging is needed in many occurrences for the purpose of specific identification, for example, for discount, or waste tracking. When such occurrences happen, a supermarket employee needs to add additional tag or sticker carry more data and this is done manually.

SUMMARY OF THE EMBODIMENTS

The present application disclosed a system and a method for for avoiding food waste, comprising: a scanner, the scanner able to read data on a barcode on a plurality of consumer products; a portable device; a processor having a memory, the memory having computer readable instructions stored thereon that when executed by the processor, receiving the data received from the scanner; displaying the data on a screen of the portable device; determining, via a processor, an expiration date of the consumer product; calculating, via a processor, a dynamic price based on the expiration date and data received from the bar code of the consumer product; and approving, via a processor, the data displayed on the portable device screen.

The present application's system and method further comprises a scanner comprised of at least one of a smart phone or any portable device. The present application further comprises, wherein the data is comprised of at least one of a picture of the consumer product, quantity, price and expiration date of the consumer product. Data is transmitted from the portable device via Bluetooth, Wi-Fi or cellular communication. Data is stored on a local or remote server. The dynamic price is projected to in-store screens or electronic shelf labels (ESL). The dynamic price is communicated via a processor to a checkout cashier.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE EMBODIMENTS

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

The suggested system contains a software that is being deployed on a smart phone or any portable computing device, the device herein must contain a barcode scanner or ability to scan barcode, a screen or touch screen and a communication module to send the data generated by the user via Bluetooth, Wi-Fi or mobile frequencies 3G/4G.

The assembly presented, is based on a novel approach to use a combination of supermarket employee's hand-held device, barcode reader, computing capabilities and wireless communication in order to attach expiration dates and quantity with stock that is being uploaded to store's shelves.

Use example: a supermarket employee just got a pallet full of products having the same SKU to the store. The employee uses the device to scan one of the products in the pallet, the barcode that was scanned retrieves product picture and typical quantity that should be included in this pallet. The employee approve the picture and quantity or has the ability to fix the data manually. Now, the employee enters product expiration date, this date will be applied to all of the products within the pallet and will be sent to the local/remote server.

Now, the server has stock level and stock expiration date, it will be used to dynamically change product prices according to their expiration dates. The suggested prices will be displayed using Electronic Shelf Label as it is commonly displayed today. The consumer then, can take a product that best match his/her willingness to pay and his/her needs.

While paying in a store cashier, every product that is applicable for a discount will send a popup message to the screen, presenting the optional 2 or 3 dates to choose from.

Figure 1:
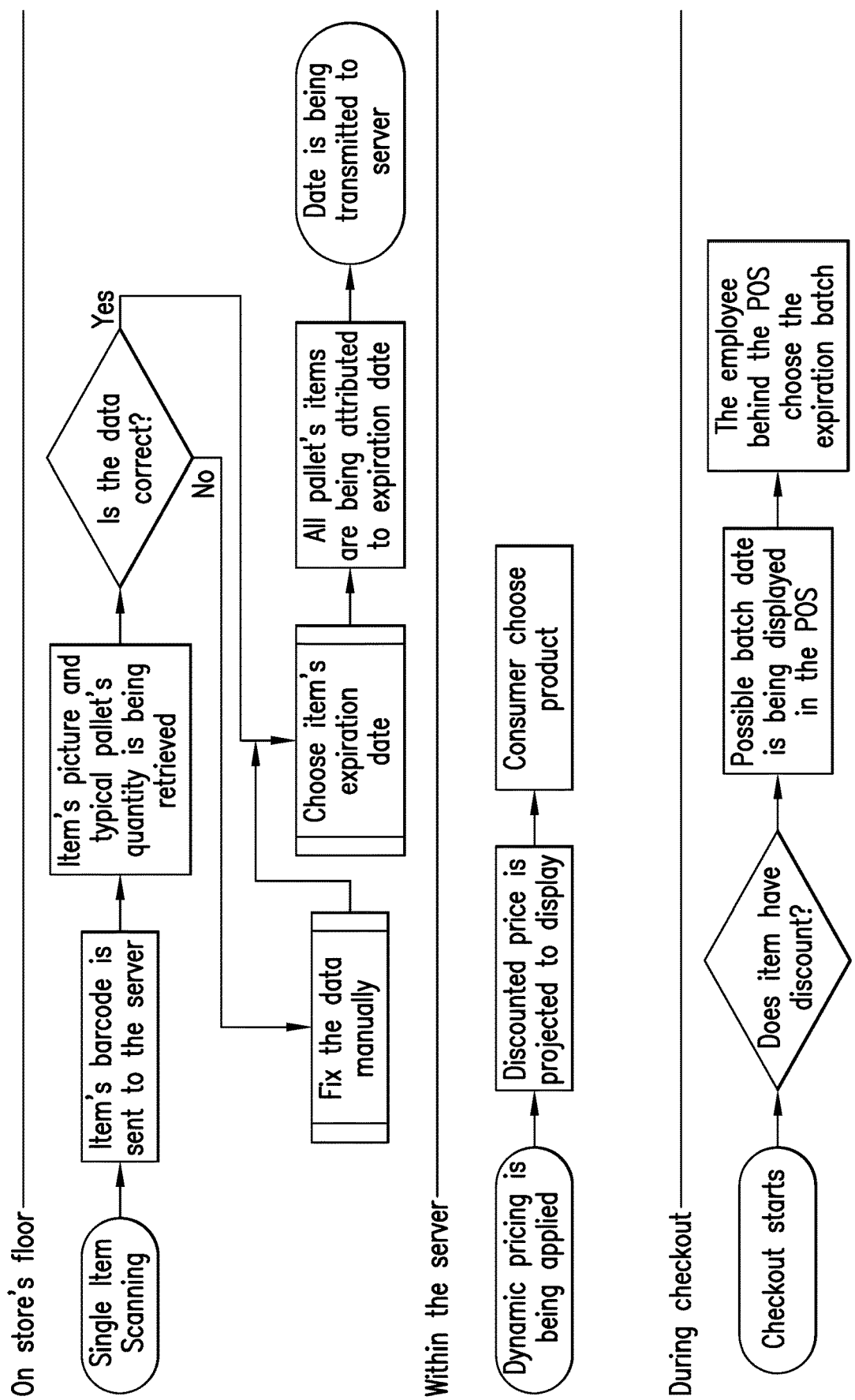
FIG. 1 illustrates the block diagrams of a system for a method to attribute expiration dates and quantities of a product to an SKU code for pricing purposes, in accordance with an embodiment of the invention.
Figure 2:
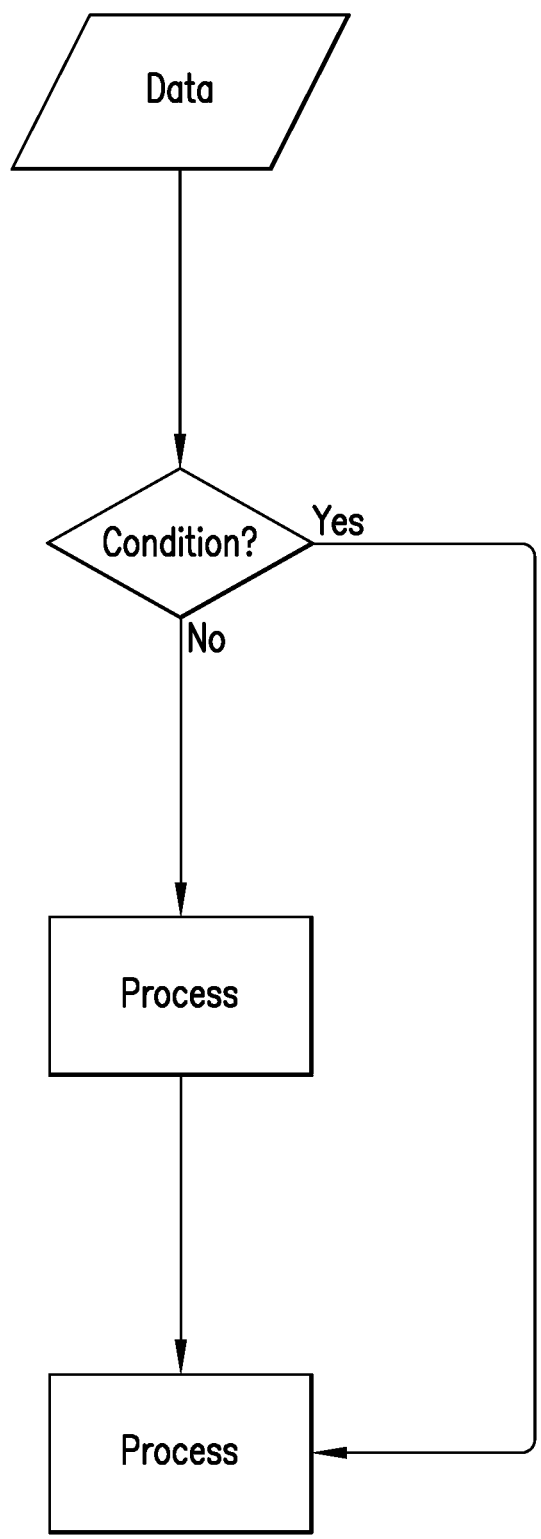
FIG. 2 illustrates a process flow of data in a system for a method to attribute expiration dates and quantities of a product to an SKU code for pricing purposes, in accordance with an embodiment of the invention.

Reference is made to FIG. 1 and FIG. 2, wherein, FIG. 1 illustrates the System operational flow:

System Operational Flow Description
1. Single Item Scanning
   Using smart phone or any portable device having the capabilities mentioned above, the store's employee scan one item from a pallet of items received at the store.
2. Data is Being Sent to Server
   The barcode that was retrieved from the scanning is being sent automatically to local or remote server in to retrieve item's picture and pallet common products quantity.

3. Data is Being Retrieved

The data that is being retrieved is displayed on portable device screen. For example the employee sees one pack of yogurt and suggested pallet quantity of 24 units.

4. Data Integrity Check

The employee can now approve the data received on the screen or fix quantity manually by using the touch screen (as shown in FIG. 2 as process).

5. Expiration Date is Added

Following steps #1 to #4 the expiration dates were now added to the every SKU that was part of the product pallet received at the store.

6. Data is Ready and Submitted

The data is being transmitted from the portable device via Bluetooth, Wi-Fi or cellular communication to the local/remote server.

7. Data is Used for Dynamic Pricing

The data that is now in the server, along with other key parameters, is used to dynamically pricing products according to their expiration dates (as shown in FIG. 2 as process).

8. Suggested Price is Being Displayed

The suggested price for a product batch, having a specific expiration date, is being now projected to in-store screens or electronic shelf labels (ESL).

9. Consumer Choose Product

The consumer now can choose a product according it's pricing and expiration date, according to what he/she needs. The consumer will possibly pay less and food waste will be reduced.

10. Checkout Process

During the checkout, Item's potential discount is automatically checked. If product SKU carries a discount within any of the batches that are currently on the shelves, a window popups to the screen forcing the cashier employee to choose the right expiration batch.

11. Discount is Being Applied

Following the on-screen selection of the expiration batch, a discount to the item is being applied.

FIG. 2 further illustrates the need for certain conditions prior to certain system processes to be run. Then system can predefine or users can define processes and conditions of the system and method of the present invention.

This method is the missing part that is needed to apply dynamic pricing to perishable food items. Using this bulk tagging capability the supermarket can attribute expiration dates to items without the pain of actually tagging the items with stickers.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method for avoiding food waste, the method comprising:

utilizing a scanner of a portable device to scan a barcode on an item located on a pallet, wherein each item on the pallet shares a Store Keeping Unit (SKU);

automatically transmitting the barcode to a server;

receiving, from the server, data associated with the barcode, wherein the data comprises at least an image of the item, a price for the item, and a quantity of the item on the pallet;

displaying the data associated with the barcode on a screen of the portable device;

receiving an input for the item from a user via the screen of the portable device, wherein the input comprises an expiration date for the item;

updating the expiration date for the item in the server;

calculating, by the server, a dynamic price for the item based on the expiration date for the item and the quantity of the item on the pallet, wherein the dynamic price is attributable to each item sharing the SKU on the pallet; and displaying the dynamic price for the item on at least one of an in-store screen, an electronic shelf label, and a processor at a checkout cashier.

2. The method of claim 1, wherein the scanner is comprised of at least one of a smart phone or any portable device.

3. The method of claim 1, wherein the data is transmitted from the portable device to the server via Bluetooth, Wi-Fi or cellular communication.

4. The method of claim 1, wherein the server is a local server or a remote server.

5. The method of claim 1, wherein the dynamic price for the item varies based on a time such that a first dynamic price for the item determined during a first time period is greater than a second price of the item determined during a second time period since the second time period is closer to the expiration date of the item than the first time period.

6. The method of claim 1, wherein the server calculates the dynamic price for the item in real-time.

7. The method of claim 1, further comprising:

receiving another input from the user via the screen of the portable device to modify or confirm at least a portion of the data; and updating the modified data in the server.

8. A system for avoiding food waste, the system comprising:

a scanner configured to read data on a barcode of an item located on a pallet, wherein each item on the pallet shares a Store Keeping Unit (SKU);

a portable device;

a processor having a memory, the memory having computer readable instructions stored thereon that when executed by the processor, is configured to: receive the data associated with the barcode from the scanner, wherein the data comprises at least an image of the item, a price for the item, and a quantity of the item on the pallet;

a screen of the portable device being configured to:

display the data associated with the barcode;

receive an input for the item from a user, wherein the input comprises an expiration date for the item; and transmit the expiration date for the item to the processor; and the processor being configured to:
- update the expiration date for the item;
- calculate a dynamic price for the item based on the expiration date for the item and the quantity of the item on the pallet, wherein the dynamic price is attributable to each item sharing the SKU on the pallet; and
- transmit the dynamic price for the item on at least one of an in-store screen, an electronic shelf label, and a processor at a checkout cashier.

9. The system of claim 8, wherein the scanner comprises a smart phone or any portable device.

10. The system of claim 8, wherein the data is transmitted from the portable device to the processor via Bluetooth, Wi-Fi or cellular communication.

11. The system of claim 8, wherein the dynamic price for the item varies based on a time such that a first dynamic price for the item determined during a first time period is greater than a second price of the item determined during a second time period since the second time period is closer to the expiration date of the item than the first time period.

12. The system of claim 8, wherein the server calculates the dynamic price for the item in real-time.

13. The system of claim 8, wherein the screen of the portable device is further configured to receive another input from the user to modify or confirm at least a portion of the data, and wherein the server is configured to update the modified data.

* * * * *